(No Model.)
J. B. DUNLOP, Sr. & J. B. DUNLOP, Jr.
SPROCKET CHAIN.
No. 552,899. Patented Jan. 14, 1896.
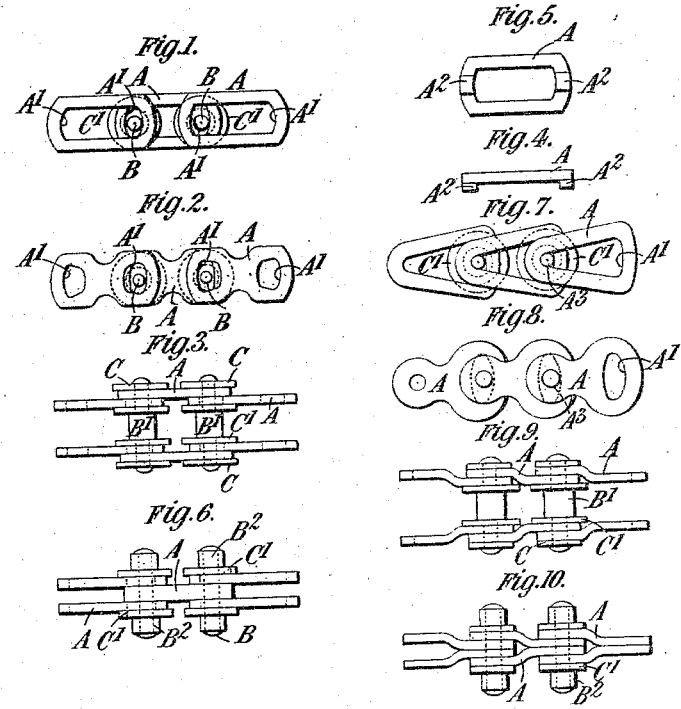
Witnesses:
Raphael Netter
Ernest Hopkinson
Inventors
John Boyd Dunlop Sr.
& John Boyd Dunlop Jr.
by Duncan & Ragg
Att'ys.

UNITED STATES PATENT OFFICE.

JOHN BOYD DUNLOP, SR., AND JOHN BOYD DUNLOP, JR., OF DUBLIN, IRELAND.

SPROCKET-CHAIN.

SPECIFICATION forming part of Letters Patent No. 552,899, dated ary 14, 1896.

Application filed November 28, 1894. Serial No. 530,265. (No model.)

*To all whom it may concern:*

Be it known that we, JOHN BOYD DUNLOP, Sr., veterinary surgeon, and JOHN BOYD DUNLOP, Jr., student, subjects of the Queen of Great Britain, and residents of Blackrock, Dublin, Ireland, have invented certain new and useful Improvements in Gear-Chains for Velocipedes and other Machines, of which the following is a specification, reference being had to the accompanying drawings.

This invention relates to gear-chains for velocipedes and other machines, and has for its object the reduction of the friction between the parts of the chain at the joints thereof, and also between the chain and the chain-wheels. For this purpose we provide extended bearing-surfaces at one or both ends of the links or side plates, the pins connecting said links rolling or moving on said bearing-surfaces.

An essential feature of this invention is that the pieces or the links having convex or sharp bearing-surfaces are alone directly supported by the chain-wheels, and that the links or the ends of the links having extended concave bearing-surfaces are permitted to oscillate freely on the pins or convex bearing-surfaces of the other links.

The action of the balance, or beam and scales, illustrates the principle of our invention. The sharp or convex surface is the fixed point, and the links having an extended bearing-surface and corresponding to the links or hooks supporting the scale are free to oscillate or bend on and off the chain-wheels.

We are aware that roller-chains have been in use before and that pins or rivets having sharp edges have been used in chains; but in those chains the links having concave bearing-surfaces are directly supported by the wheels, resulting in an increase of friction due to the pull or tractional force of the chain not being in a line at right angles to the bearing-surfaces in immediate contact when the links are bending on or off the wheels.

In order that our invention may be clearly understood, we will now describe the same with reference to the accompanying drawings, in which—
Figure 1 is a side view of a portion of a gear-chain constructed according to our invention, parts being removed. Fig. 2 is a similar view showing a modified form of link or side plate. Fig. 3 is a plan of a portion of a chain, such as that shown in Figs. 1 or 2. Fig. 4 is a plan of a modified form of the link illustrated in Fig. 1. Fig. 5 is a side view of the same. Fig. 6 is a plan of a portion of a modified form of chain. Figs. 7 and 8 are side views showing further modifications in the shape and arrangement of the links. Fig. 9 is a plan of a portion of a chain, such as that shown in Figs. 7 or 8. Fig. 10 is a plan showing a further modification.
In Figs. 1, 2, and 7 the washers on the ends of the pins are removed in order that the shapes of the links or side plates may be more clearly seen.

Like letters denote similar parts throughout the drawings.

A A are the links of which the chain is composed.

B B are the pins or rivets which connect the links together. The said pins are provided with thickened middle portions, as shown at B' B' in Figs. 3 and 9, or short tubes or sleeves may be provided surrounding the middle portions of the pins for the purpose of keeping the inside washers and links at the proper distance apart.

In Figs. 1, 2, and 3 the links of the chain shown have the form of elongated rings in Fig. 1 and the form of plates in Fig. 2. The parts A' A' of the links, against which the pins B B bear when the chain is in use, are made larger than the ends of the pins, so that a rolling contact is made between said links and pins, and the friction between said links and pins and between the chain and chain-wheels is considerably reduced.

The bearing-surfaces A' A' of the links shown in Figs. 1 and 2 are preferably curved to a radius somewhat less than half the length of the link.
The bearing-surfaces A A of the links shown in Figs. 7 and 8 are preferably curved to a radius somewhat less than the length of the link.

The pins are held in position in the links by means of washers C C, in which the ends of said pins are riveted. Other washers C' C' are interposed between the links and the parts B' B' of the pins.

In the chain formed of links, as shown in Fig. 4, the bearing-surfaces of the links or side plates are made broader than the remaining portions of the links, the broadened ends $A^2 A^2$ of each link being arranged in such a manner as to project into the adjacent links. One of the inner links of such a chain is shown in elevation in Fig. 5.

The chain is built up as follows—that is to say, the washer C' is first placed on each end of the pins so as to abut against the shoulder formed by the middle thickened portion B' of the pins. The links A A are next placed in position and the outer washers C C are placed on the pins, the ends of which are riveted over the said outer washers to hold the parts of the chain together. The ends of the pins B B are preferably round; but they may be of oval section, and the washers are provided with holes corresponding in size and shape to the ends of the pins. The object of the inside washers C' C' is to prevent contact of the links with the chain-wheel, and at the same time to prevent a rubbing or grinding action between the links and the pins. When the chain is in use the central portions of the pins work in the grooves or spaces between the teeth of the chain-wheels and the pins are the only parts of the chain which bear on the wheels, the links being arranged to work out of contact with the said wheels.

In the modification of our invention shown in Fig. 6 the links are mounted on the middle portions of the pins, and washers C' C' and ferrules $B^2 B^2$ are placed on the ends of the pins. The pins are then riveted over onto the outer ends of the short ferrules, as shown. In this case the pins are preferably of the same section throughout their length and are not made thicker in the middle than at the ends. With a chain of this description it is necessary to employ chain-wheels which have a deep circumferential groove in which the links are received, in order that the pins only may be directly supported by the chain-wheels.

We sometimes construct gear-chains in which the rolling motion is confined to one end of each of the links. For example, the links may have the form of elongated or triangular rings, as shown in Fig. 7, one end of each link being formed with a small bearing-surface $A^3$, the other end having a larger bearing-surface $A'$. In this chain the ends of the pins may be made oval or triangular in transverse section, with a narrow or sharp bearing-surface; but they are preferably round, as shown. The links may also be made of plates of the form shown in Fig. 8, in which case the hole $A^3$ at one end of each link is formed to fit the pin B, which is preferably round, as shown, the said pin being riveted therein, the other end of each link having a slot which forms a long bearing-surface $A'$ for the pin. In both cases we prefer that the links should not be flat, but bent, as shown in Fig. 9, which figure also very clearly shows the method of building up the chain, which is similar to that hereinabove described with reference to Fig. 3. Washers are not necessary on the pins at $A^3$ in Fig. 8. In a modified form of chain having links of this description the ends of the pins bear on the teeth of the chain-wheel, as hereinbefore described with reference to Fig. 6. Such a chain is shown in plan in Fig. 10 and need not be further described.

What we claim is—

1. In a gear chain the combination with links having extended or broad bearing surfaces, of pins or rivets connecting said links, adapted to roll on said bearing surfaces, the said pins being adapted to rest upon or be supported directly by the chain wheel, while the links themselves are so formed as not to come in contact with the chain wheel.

2. In a gear chain the combination with links having bearing surfaces, and formed to avoid contact with the chain wheel, of pins or rivets connecting said links, and adapted to roll on said bearing surfaces, said pins being adapted to be supported directly by the chain wheel, and washers on the pins for lessening friction between the pins and links, and the links and chain wheel.

In testimony whereof we have hereunto set our hands this 5th day of November, 1894.

JOHN BOYD DUNLOP, Sr.
JOHN BOYD DUNLOP, Jr.

Witnesses:
HENRY HAM,
LEONARD LEADER SULLIVAN.